United States Patent
DePaoli et al.

(10) Patent No.: US 6,265,025 B1
(45) Date of Patent: Jul. 24, 2001

(54) METHOD FOR THE PRODUCTION OF ULTRAFINE PARTICLES BY ELECTROHYDRODYNAMIC MICROMIXING

(75) Inventors: David W. DePaoli; Zhong Cheng Hu, both of Knoxville; Constantinos Tsouris, Oak Ridge, all of TN (US)

(73) Assignee: Lockheed Martin Energy Research Corporation, Oak Ridge, TN (US)

( * ) Notice: Subject to any disclaimer, the term of this patent is extended or adjusted under 35 U.S.C. 154(b) by 0 days.

(21) Appl. No.: 09/398,108

(22) Filed: Sep. 16, 1999

(51) Int. Cl.[7] ............... B01J 13/02; B05D 7/00
(52) U.S. Cl. ............... 427/213.3; 427/231.31; 427/231.36; 428/402.2; 428/402.21; 428/402.24; 264/10; 264/438
(58) Field of Search ............... 427/213.3, 213.31, 427/213.36; 428/402.2, 402.21, 402.24; 264/10, 438

(56) References Cited

U.S. PATENT DOCUMENTS

| | | |
|---|---|---|
| 2,884,375 | 4/1959 | Seelig et al. . |
| 4,264,641 * | 4/1981 | Mahoney et al. ............... 427/483 |
| 4,341,617 | 7/1982 | King . |
| 4,435,261 | 3/1984 | Mintz et al. . |
| 4,439,980 | 4/1984 | Biblarz et al. . |
| 4,508,265 | 4/1985 | Jido . |
| 4,543,341 | 9/1985 | Barringer et al. . |
| 4,606,801 | 8/1986 | Prestridge et al. . |
| 4,622,119 | 11/1986 | Cerkanowicz et al. . |
| 4,624,764 | 11/1986 | Mintz et al. . |
| 4,634,510 | 1/1987 | Mintz et al. . |
| 4,661,226 | 4/1987 | Mintz et al. . |
| 4,767,515 | 8/1988 | Scott et al. . |
| 4,767,929 | 8/1988 | Valentine . |
| 4,798,710 | 1/1989 | Legrand et al. . |
| 4,830,993 | 5/1989 | Legrand et al. . |
| 4,941,959 | 7/1990 | Scott . |
| 5,023,071 | 6/1991 | Sherif . |
| 5,122,360 | 6/1992 | Harris et al. . |
| 5,207,973 | 5/1993 | Harris et al. . |
| 5,262,027 | 11/1993 | Scott . |
| 5,385,658 | 1/1995 | Scott . |
| 5,464,195 | 11/1995 | Sisson et al. . |
| 5,503,372 | 4/1996 | Sisson et al. . |
| 5,762,775 | 6/1998 | DePaoli et al. . |

OTHER PUBLICATIONS

"Electrohydrodynamic mixing and instability induced by co–linear fields and conductivity gradients," J.F. Hoburg et al., The Physics of Fluids, vol. 20, No. 6, pp. 903–911, Jun. 1977.

"Dielectrophoretic Process of Liquid–Liquid Mixing," Bruce Holland, I&EC Fundamentals, vol. 5, No. 2, pp. 204–207, May 1966.

"Mixing With An Electrostatic Field," Cropper et al., I&EC Fundamentals, vol. 1, No. 1, pp. 48–52, Feb. 1962.

"Preparation and Properties of Uniform Size Colloids," Matijevic, Chem. Mater, vol. 5, No. 4, pp. 412, 420, 1993, (No Month).

"Pumping, Spraying, and Mixing of Fluids by Electric Fields," Tsouris et al., The Canadian Journal of Chemical Engineering, vol. 76, pp. 589–599, Jun. 1998.

"Sol–Gel Synthesis and Catalytic Properties of Sulfated Zirconia Catalysts," Binghui Li et al., Ind. Eng. Chem. Res., vol. 35, No. 9, pp. 3141–3148, 1996, (No Month).

"Synthesis and formation mechanism of submicrometre spherical cordierite powders by ultrasonic spray pyrolysis," Janackovic et al., Journal of Materials Science 32, pp. 163–168, 1997, ( No Month).

"Continuous, Rapid Production of Uniform Microparticles by Electrodispersion," DePaoli et al., Prepared for Presentation at 1998 Annual Meeting of the American Institute of Chemical Engineers, Nov. 16, 1998, Session 21–Sol–Gel Synthesis of Particles.

"Electrohydrodynamic Mixing in Multiphase and Miscible Systems," DePaoli et al, AIChE 1997 Annual Meeting, Los Angeles, California, Nov. 20, 1997.

"Continuous, Rapid Production of Uniform Microparticles by Electrodispersion," DePaoli et al, AIChE 1998 Annual Meeting, Miami Beach, Florida, Nov. 16, 1998.

* cited by examiner

Primary Examiner—Nathan M. Nutter
(74) Attorney, Agent, or Firm—Kilpatrick Stockton LLP

(57) ABSTRACT

The present invention relates to a method for the rapid production of homogeneous, ultrafine inorganic material via liquid-phase reactions. The method of the present invention employs electrohydrodynamic flows in the vicinity of an electrified injector tube placed inside another tube to induce efficient turbulent mixing of two fluids containing reactive species. The rapid micromixing allows liquid-phase reactions to be conducted uniformly at high rates. This approach allows continuous production of non-agglomerated, monopispersed, submicron-sized, sphere-like powders.

44 Claims, 5 Drawing Sheets

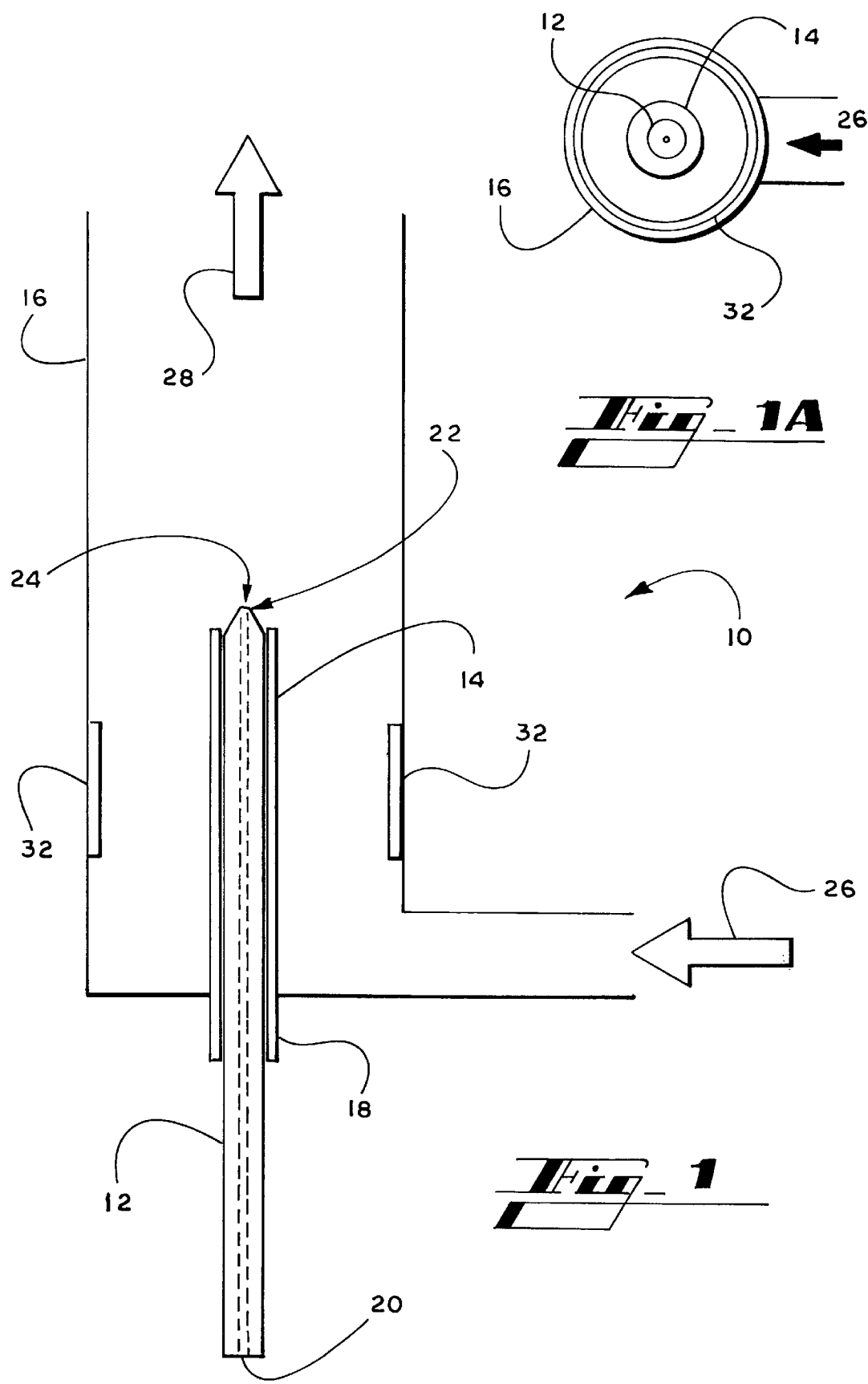

Butanol into deionized water Figure 2A
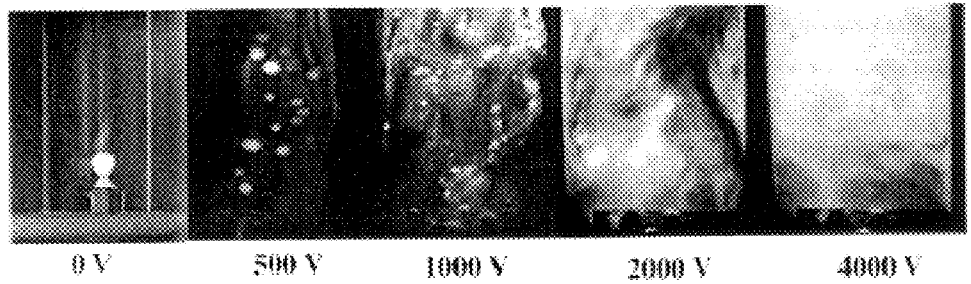
0 V    500 V    1000 V    2000 V    4000 V
Isopropanol into deionized water Figure 2B
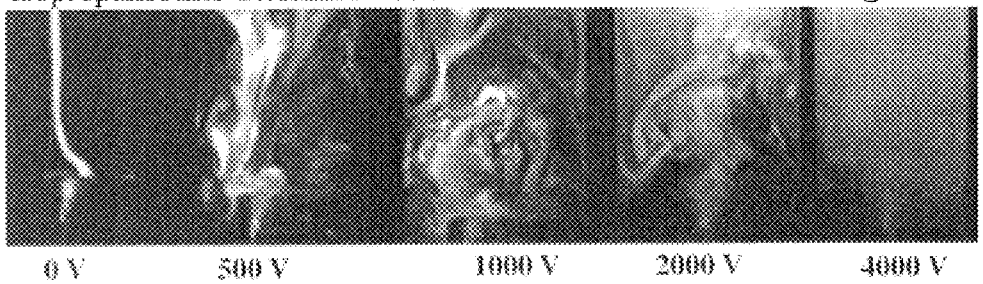
0 V    500 V    1000 V    2000 V    4000 V
Ethanol into deionized water Figure 2C
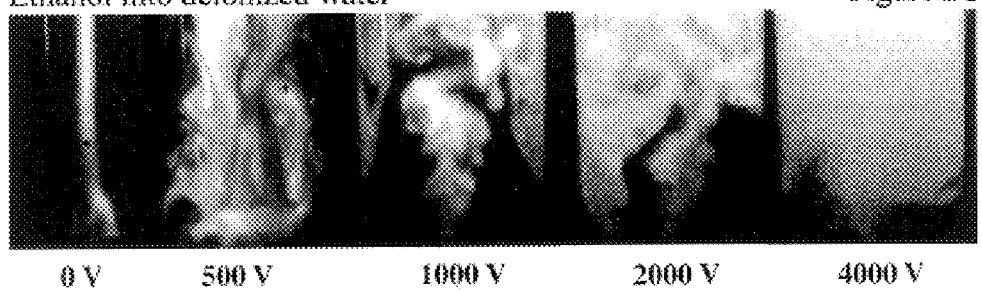
0 V    500 V    1000 V    2000 V    4000 V
Water into deionized water Figure 2D
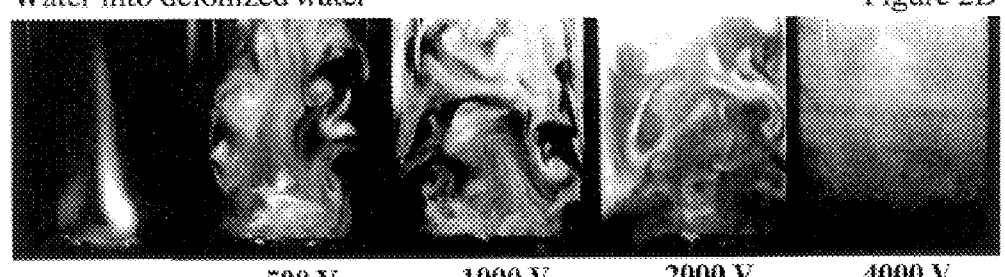
0 V    500 V    1000 V    2000 V    4000 V
Ethanol into Ethanol Figure 2E
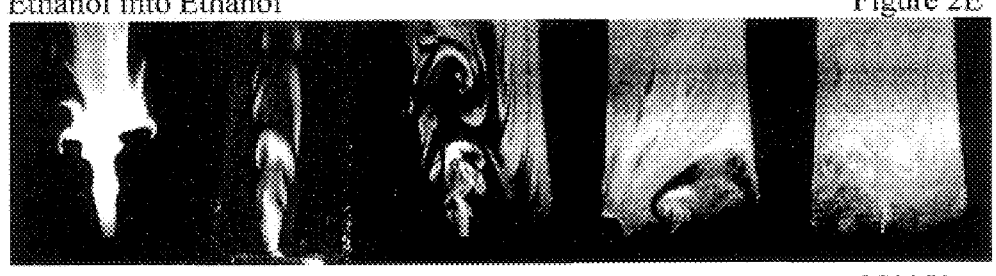
0 V    500 V    1000 V    2000 V    3500 V Figure 5A
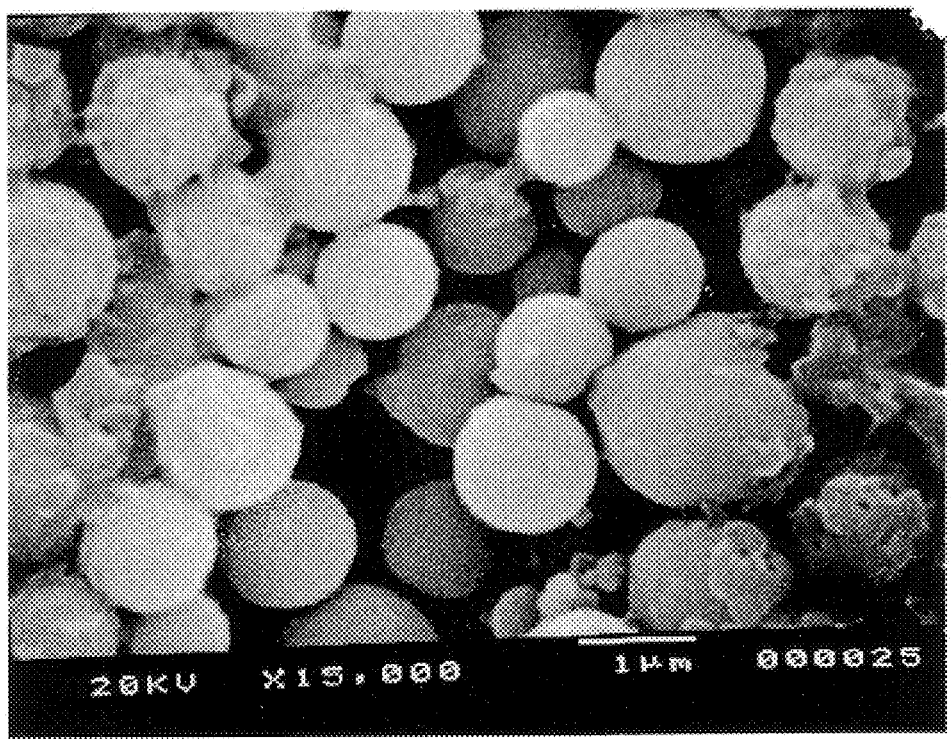
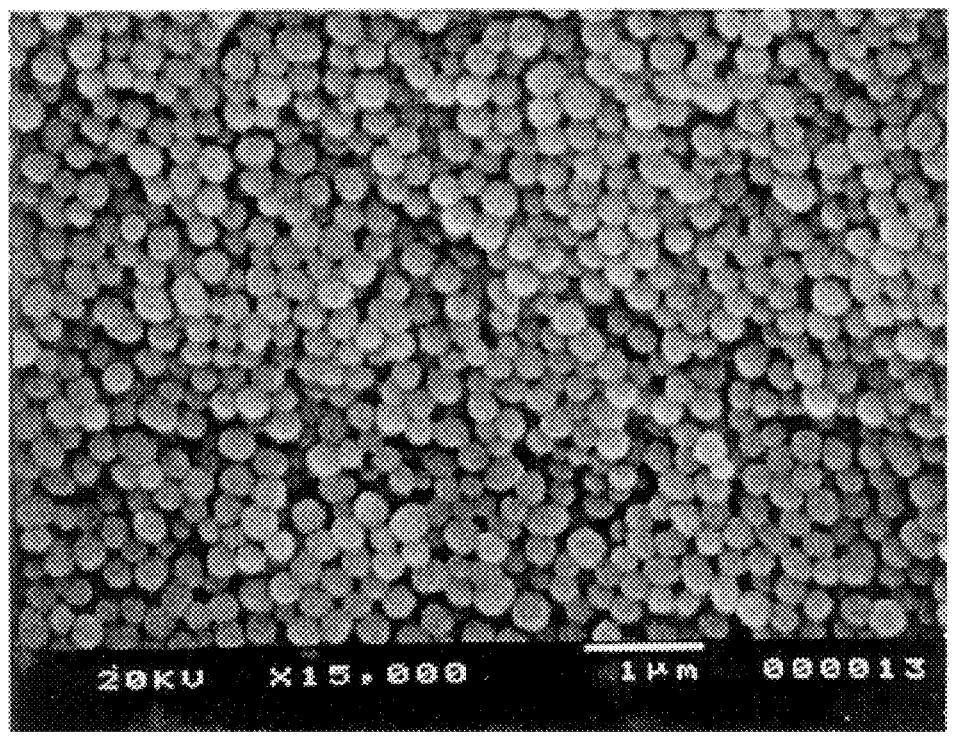
Figure 5B

METHOD FOR THE PRODUCTION OF ULTRAFINE PARTICLES BY ELECTROHYDRODYNAMIC MICROMIXING

GOVERNMENT LICENSE RIGHTS

This invention was made with Government support under Contract No. DE-AC05-96RO22464 awarded by the U.S. Department of Energy to Lockheed Martin Energy Research Corp., and the Government has certain rights in this invention.

FIELD OF INVENTION

The present invention relates to a method for the production of homogeneous, ultrafine inorganic materials. Specifically, electrohydrodynamic flows are utilized to induce turbulent mixing of fluids containing reactive species, thereby producing non-agglomerated, submicron-sized particles.

BACKGROUND OF INVENTION

Ultrafine particles constitute the key building blocks for diverse advanced structural and functional materials, such as high-performance ceramics and alloys. These advanced materials have tremendous impact in many areas, including catalysts, separations, electronics, energy production processes, and environmental applications. Of particular importance, nanophase ceramic or metallic materials that contain nanosized (<100 nm) particles/grains show dramatically improved performance (mechanical, electrical, optical, magnetic, and/or catalytic). The characteristics of ultrafine particles, i.e., size, morphology, monodispersity, purity, and homogeneity of composition directly determine the properties of the materials that are made from them. Thus, the future application of advanced materials depends on the capability to produce particles with outstanding characteristics.

Currently, there is a strong need for more efficient methods of production of high-quality inorganic particles. Ideally, an instantly reactive, continuous process that generates homogeneous ultrafine particles with controllable characteristics is desired. The primary technologies for synthesis of ultrafine particles are liquid-phase chemical and sol-gel processing, and gas-phase condensation. Most of the production processes for both approaches are conducted in batch mode. Gas-phase reactions typically require extreme conditions such as high vacuum and high temperature and give very slow particle production rate. A few continuous, liquid-phase processes have been developed for production of microspheres from alkoxide; however, these involve relatively slow kinetics during hydrolysis and condensation, typically 30 minutes or more reaction time. In contrast, real metal alkoxides are so reactive that agglomerated solids, rather than dispersed particles, are formed under conditions with rapid reaction kinetics. Thus, controlled hydrolysis/condensation of alkoxides in a batch reactor is the usual approach for the production of monodispersed metal oxide precursor powders.

Tubular-type reactors have been designed for the continuous synthesis of ultrafine ceramic particles such as titania and ferric oxide via hydrolysis and condensation of metal alkoxides. In addition, liquid spraying techniques including electrostatic spraying/atomization and ultrasonic spraying of liquids into gas have been used in ceramic particle production.

SUMMARY OF INVENTION

The present invention solves the above-described problems by providing a method for the production of inorganic particles involving electrohydrodynamic flows to rapidly and efficiently mix two reacting liquid streams in a process. The micromixing induced by this process is very advantageous for reactive systems that generate solid particles. Since the mixture is homogenized very quickly, it is possible to continuously operate with faster reaction rates and yet result in a homogeneous product.

The method of the present invention comprises injecting a first fluid into a first conduit, and injecting a second fluid through a second conduit into the first conduit wherein the second conduit is partially disposed within the first conduit. An electric field is then applied between the two conduits. Either the first fluid or second fluid contains a species reactive with that of the other fluid to induce particle-producing reactions.

More particularly, the first fluid may be introduced continuously into the first conduit, and the first fluid may be miscible, or partially miscible or immiscible with the second fluid. The second conduit may be disposed within the first conduit so that there is an annular space between the second conduit and the first conduit.

The electric field is applied between the second conduit and an electrode placed either on the interior or the exterior of the first conduit. Alternatively, the electric field may be applied between the second conduit and an electrode comprising the first conduit.

Electrodynamic flows inducing turbulent mixing of the first and second fluids are caused by charge injection at the tip of the second conduit.

Particle producing reactions suitable for the present invention include sol-gel reactions, inverse phase precipitations, and chemical reduction reactions.

Other objects, features and advantages of this invention will become apparent upon reading the following detailed description in conjunction with the drawings, photographs, and claims.

BRIEF DESCRIPTION OF DRAWINGS AND PHOTOGRAPHS

FIG. 1 is an axial cross section of an apparatus made in accordance with an embodiment of the present invention.

FIG. 1a is a radial cross section of the apparatus in FIG. 1.

FIGS. 2a through 2e are a series of photo images demonstrating electrohydrodynamic mixing according to an embodiment of the present invention.

Figure 3A:
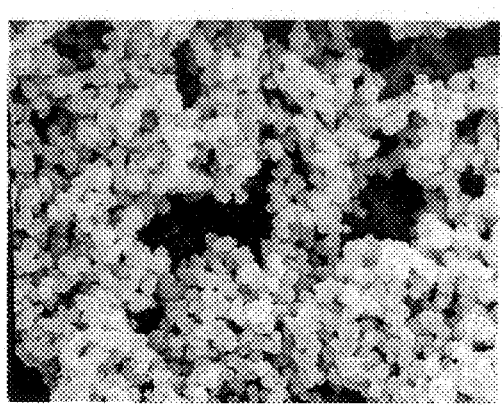
Figure 3B:
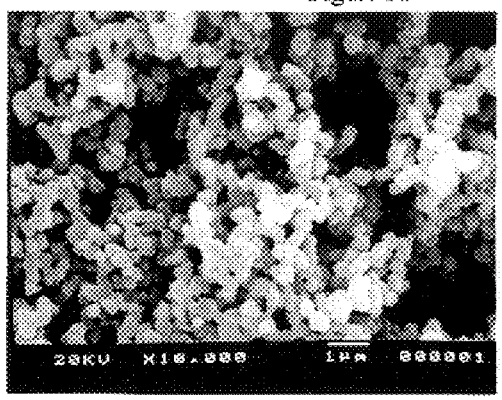
Figure 3C:
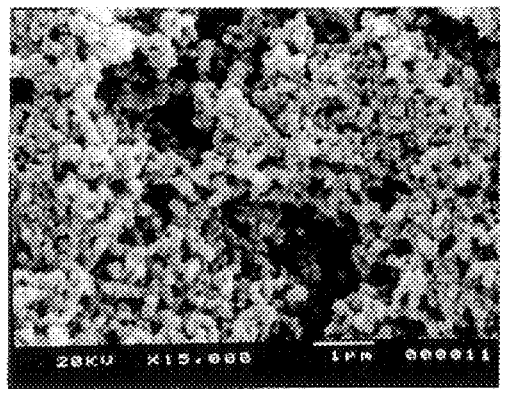
Figure 3D:
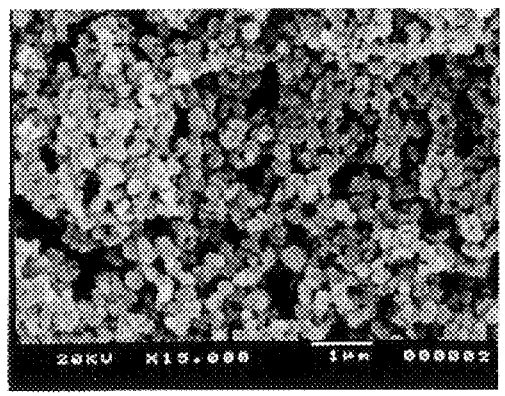

FIGS. 3a through 3d, 4a through 4c and 5a and 5b are photo images of particles produced according to an embodiment of the present invention.

DETAILED DESCRIPTION OF THE INVENTION

The method of the present invention provides a process for the rapid production of homogeneous ultrafine inorganic materials via liquid-phase reactions. This process is accomplished through the use of electrohydrodynamic flows in the vicinity of an electrified capillary tube placed inside another tube to induce efficient turbulent mixing of the two fluids containing reactive species. This process may be accomplished through the use of one or more capillary tubes. The rapid micromixing allows liquid-phase reactions to be conducted uniformly at high rates. This approach allows continuous or batch production of non-agglomerated, monodispersed, submicron-sized, sphere-like powders. The size and homogeneity of product can be controlled through selection of reaction conditions, including reactant concentrations, type of alcohol solvent, fluid flow rates, and applied voltage.

The method of the present invention is appied using the electrohydrodynamic micromixing reactor described in the U.S. Pat. App. Ser. No. 09/398,675 "Electrohydrodynamic Micromixing Reactor Reactor", David W. DePaoli and Constantinos Tsouris, field concurrently herewith and which is incorporated herein by reference in its entirety. As indicated in FIG. 1, the reactor comprises an injector tube 10, comprising a capillary tube 12 and an insulating tube 14, is disposed partially within and coaxial with a section of a larger, outer tube 16. In the method of the illustrated embodiment, a first fluid is conveyed in the larger outer tube 16 and a second fluid is introduced through the injector tube 10 into the interior of the outer tbe and into the first fluid by electrohydrodynamic mixing. The first fluid and second fluid may be completely miscible, partially miscible, or immicisble with each other. Additionally, both the first fluid and second fluid may comprise more than one fluid, specifically more than one chemical species that can be completely miscible, partially miscible, or immiscible. Because the outer tube 16 has a larger diameter than the capillary tube 12 and is capable of handling larger volumes of liquid than the capillary tube 12, the first fluid, the fluid that is conveyed in the annular space between the injector tube 10 and the larger outer tube 16 forms the continous phase of the resultant solution. The second fluid, which is conveyed within and injected via the capillary tube 12, is introduced into the first fluid and dispersed in the first fluid by electrohydrodynamic mixing.

In the illustrated embodiment, the injector tube 10 comprises a capillary tube 12 that is insulated with an insulating tube 14. The capillary tube 12 has two ends, a first end and a second end. The capillary tube 12 penetrates the outer tube 10 through an opening 18 in the outer tube 16, such that the first end of the capillary tube is located outside of the larger, cylindrical outer tube 16 and the second end of the capillary tube is located within the outer tube 16. Desirably, the seal between the outer tube 16 and the injector tube 10, which in the illustrated embodiment comprises the capillary tube 12 and the insulating tube 14, is fluid tight or substantially fluid tight. At the first end of the capillary tube is located a capillary tube inlet 20 for receiving a fluid. The fluid is conveyed from the capillary tube inlet 20 through the interior of the capillary tube 12 to the second end of the capillary tube at which is located a capillary tip 22 that terminates with a capillary tube outlet 24. The capillary tip 22 may be conical in shape as shown in FIG. 1. A fluid that is injected into the capillary tube inlet 20 exits the capillary tube outlet 24 and disperses into any fluid or combination of fluids that is conveyed within the interior of the larger, outer tube 16. The flow of the fluid conveyed within the larger, outer tube 16 can be in the same general direction as the flow of the liquid within the capillary tube 12 or counter to the flow of the liquid within the capillary tube.

The insulating tube 14 electrically insulates the capillary tube 12 from the outer tube 16 and prevents electrical discharge. The insulating tube 14 surrounds and insulates the portion of the capillary tube 12 proximate the opening 18 of the outer tube through which the injector tube 10 is inserted. Desirably, the insulating tube 18 surrounds and insulates the capillary tube 12 from the portion of the capillary tube exterior the outer tube to an area proximate the capillary tip 22. The insulating tube 14 can be constructed of any nonconductive material capable of electrically insulating the capillary tube 12 from the outer tube 16. Desirably, the nonconductive material is an electrically insulating material that is compatible with and does not react with any fluid and chemical species to which it may be exposed during normal use. More desirably, the insulating tube is made of a material that is capable of withstanding voltages that may be applied to the capillary tube and apparatus. Suitable insulating materials include, but are not limited to ceramics, various glass compositions, chemically and electrically resistant plastics such as TEFLON, with ceramics being the most preferred. Alternatively, the injector tube can be a capillary tube that is coated with an insulating material rather than comprising a capillary tube and a separate insulating tube.

The capillary tube 12 and injector tube 10 can be constructed of any electrically conductive material or a combination of materials comprising a layer of a conductive material or a conductive capillary tip 22. Desirably, the injector tube, the capillary tube and capillary tip are constructed of materials that are compatible with and that are not chemically reactive with any fluids and any chemically reactive species that they may be exposed to. More desirably, the material is able to withstand electrical breakdown. In the embodiment of the apparatus used in the Examples, the capillary tube is made of a metal alloy, specifically, a stainless steel. Stainless steel was chosen because of its commercial availability, high conductivity and relative inertness. Tungsten is another example of a suitable metal. In instances where stainless steel and other metals may not be desirable, because such metals may react with the fluids and species contained and generated within the apparatus, the exposed parts of the capillary tube, particularly the capillary tip, and even the entire capillary can be made of graphite or a conductive polymer. Desirably, the material from which the capillary tip is made is not reactive with or detrimental to the fluids and species contained and generated within the apparatus and resists electrical breakdown.

The outer tube 16 is larger than the injector tube 10 or the capillary tube 12 and the insulating tube 14 that surrounds the capillary tube 12 and is designed such that it conveys at least one fluid. The outer tube 16 comprises an inlet 26 for receiving at least one fluid and an outlet 28. The outer tube can be a straight tube or pipe or can be curved and comprise one or more turns or bends. The outer tube 16 can be made of any material that is capable of conveying fluids that are either conductive or nonconductive. Examples of conductive materials from which the outer tube can be made include, but are not limited to, various metals and their alloys, such as, ductile iron, cast iron, stainless steel, brass, copper, etc. Suitable nonconductive materials from which the outer tube can be made include, but are not limited to, glass, ceramics, and plastics such as TEFLON. When the outer tube 16 is constructed from a nonconductive material and the outer tube 16 is itself substantially nonconductive, at least one electrode 32 is positioned in proximity of the capillary tube outlet 24.

The capillary tube 12 and outer tube 10 may have any dimensions, with their sizes being limited only by the flow capacity of the tubes, the desire to achieve sufficient mixing of the fluids, and the desire to prevent clogging of the tubes. Capillary tubes 12 having an inside diameter of 0.25 to 1.0 mm work well. The outer tube 10 cannot be too small relative to the capillary tube 12, or sufficient mixing will not be achieved. Conversely, the outer tube 10 cannot be too large relative to the capillary tube 12, or the entire fluid will not be subjected to the high velocity flows near the capillary tip 28. The outer tube 10 preferably has an outside diameter of 0.5 cm to 10 cm.

The apparatus used in the method of the present invention is capable of various modifications from those described and illustrated without departing form the spirit and scope of the invention. A few of which are discussed below. Generally, the outer tube 16, injector tube 10 and the capillary tube 12 are conduits and can be of any shape capable of conveying fluids. The term "conduit" as used herein indicates a channel through which something, especially fluids, can be conveyed. The term "fluid" as used herein includes liquids and gasses. Examples of conduits include, but are not limited to, pipes, tubes, capillaries, and the like. The term "capillary" as used herein indicates a conduit having a very small opening. Desirably, the capillary tube 12 should have an opening with a cross sectional area that is at least a two orders of magnitude smaller than the cross sectional area of the outer tube 16 where the opening of the capillary tube outlet 26 is located. The cross sections of the outer tube 16 and injector tube 10 are typically both circular but can vary in size and shape and can also vary in shape from each other. For example, the cross section of either or both the outer tube and the injector tube can be elliptical and can be increased or decreased to increase or decrease the flow and/or pressure.

The electrode 32 or more than one electrode can be positioned along the inside or outside of the outer tube wall and may even be integral and formed as a component for the outer tube wall. By way of nonlimiting examples, the electrode can be one or more conductive elements such as a metal strip, rod or disk that can be placed along the wall of the outer tube 16 and parallel with the axis of outer tube as illustrated or the electrode can be a metal strip or rod that is wrapped around the circumference of the outer tube proximate the capillary tube outlet, either inside, outside or forming an integral portion of the outer tube wall. Alternatively, at least a portion of the outer tube 16 is formed from a metal or other conductive material in proximity to the capillary tube outlet 28 such that an electric potential difference between the portion of the outer tube that is conductive and the capillary tube outlet 28, the conical tip 22, the capillary tube 12 or the injector tube 10 has an influence on the fluid exiting the outlet and induces electrohydrodynamic mixing of the fluid.

A means for applying an electric potential difference at the outlet 24 can be any means of power supply capable of generating a potential difference between the outlet 24 and an electrode or a conductive portion of the outer tube proximate the outlet 24. In the illustrated embodiment, the metal capillary tube 12 is connected to a high-voltage power supply and the counter electrode. Alternatively, the outer tube wall can be conductive or comprise a conductive portion proximate outlet 24 and is connected to the other lead of the power supply or electrical ground. Desirably, all wetted surfaces inside the apparatus should be constructed of materials that are nonreactive with the process fluids and the conical tip 22, capillary tube or injector tube outlet 24 are constructed of material capable of withstanding voltages that may be applied.

In the present invention, at least two fluids are introduced into the device. A first fluid that may comprise one or more fluids or chemical species is conveyed in the outer tube 16. A second fluid that also may comprise one or more fluids or chemical species is conveyed in the inside of the metal capillary tube 12 or injector tube 10. In the illustrated embodiment, the first fluid is conveyed in the annular space between nonconductive tube that insulates the capillary tube 12 and the outer tube 16 and forms the continuous phase of a solution of the first and second fluids. The second fluid, which may be miscible, partially miscible or immiscible with the first fluid forms the dispersed phase in the solution. The flow rate of both fluids may be adjusted individually to affect the output flow. For example, the ratio of the flow of either fluid may be adjusted relative to the other fluid to affect the reaction dynamics. Application of a high-voltage potential difference between the metal capillary tube 12 and the outer electrode 32 or conductive portion results in enhanced mixing of the two fluids. This mixing is due to electrohydrodynamic flows caused by the motion of charge carriers in the electric field.

Electrodynamic flows caused by charge injection at the tip 28 of the capillary tube 12 induce turbulent mixing in the vicinity of the tip. This leads to rapid and complete mixing of the fluids, up to molecular level mixing. The mixed fluids pass down the outer tube 10, during which time the particle producing reactions proceed. The flow may be directed to a collection vessel for settling, or alternatively the particles in a stable sol may be removed by other solid-liquid separation techniques such as filtration and centrifugation. The background solvent flow can be conditioned and recycled for reuse.

The concentrations of reactive species and flow rates of the two streams are carefully selected to optimize reaction rates, based on the following factors: (1) for maximum production rate, the concentration of reactive species in the second fluid is increased, but not to the point at which the injector tube tends to clog, or particle flocculation occurs in the reaction zone: (2) the concentration of the reactant in the first fluid is selected to cause a relatively rapid reaction rate, e.g., within several seconds to reduce the volume of the reactor tubing and/or residence time in a collection vessel, yet slow enough so that the fluids mix completely before significant reaction occurs, and (3) the concentrations of the reactants in both fluids are chosen to control particle nucleation rates, which govern final particle size.

The first fluid may be introduced continuously into the reactor and may be miscible, partially miscible or immiscible with the second fluid. Almost any fluid may be used as the second injected fluid. However, it is preferred that the first fluid have a low enough conductivity that significant Ohmic conduction does not occur. In addition, it is preferred that the first fluid have a high dielectric constant. Examples of fluids having these characteristics include deionized water, ethanol, other alcohols, and their mixtures, etc.

Suitable reaction systems for the present invention include sol-gel reactions. For example, sol-gel reactions of organometallic species such as alkoxides dissolved in alcohol may be used. Suitable alkoxides include, but are not limited to zirconium butoxide, zirconium ethoxide or zirconium isopropoxide. Examples of alcohols include, but are not limited to ethanol, butanol, methanol and isopropanol. The reactant in the second fluid is typically water, which induces hydrolysis and condensation of the alkoxides in the first fluid.

Any chemical reaction system known in the art to produce solid particles may be used with the method of the present invention. Examples of such reactions, include, but are not limited to Stober microsphere, i.e. silica, production via hydrolysis and condensation of tetraethylorthosilicate (TEOS) or tetramethylorthosilicate (TMOS) under base catalysis in alcohol/water mixtures; titania microsphere particle production by hydrolysis and condensation of titanium alkoxides in alcohol-water solutions; monodispersed spherical ferric oxide particles by hydrolysis of $Fe(OC_4H_9)_3$ in an octanol/acetonitrile solution; monodispersed spherical silicon carbide particles by hydrolysis and condensation of phenyltrimethoxysilane (PTMS) or a mixture of PTMS and TEOS from a system of silane-water-catalyst; production of binary oxide particles such as $RuO_2$—$SnO_2$, and $IrO_2$—$Ta_2O_5$ by sol-gel processes; preparation of uniform coated inorganic colloidal particles, such as silica coated hermatite, titania coated silica, titania coated zinc oxide, and yttrium basic carbonate on polystyrene latex, etc.; inversed phase precipitations such as dilution of sulfur-ethanol solution into water and spraying of organic polymer solution, e.g. polysulfone dissolved in tetrahydrofuran, into water; and metallic clusters/particles formation via chemical reduction reactions.

In another embodiment of the present invention, multiple capillary tubes 12 are used within a single outer tube 10 to achieve electrohydrodynamic mixing or for the introduction of multiple reactants.

As compared to classical batch synthesis of particles, the method of the present invention provides a faster particle production rate, the option of continuous production, and a higher solids fraction with a higher initial reactant concentration. In addition the method of the present invention provides a stable ultrafine particle sol product, and the size and monodispersity of the particles are controllable.

This invention is further illustrated by the following examples, which are not to be construed in any way as imposing limitations upon the scope thereof. On the contrary, it is to be clearly understood that resort may be had to various other embodiments, modifications, and equivalents thereof, which, after reading the description herein, may suggest themselves to those skilled in the art without departing from the scope of the present invention.

EXAMPLES

Examples 1–5 illustrate the level of electrohydrodynamic mixing accomplished by the method of the present invention. No reactions took place in these examples. An electrohydrodynamic micromixing reactor was used to mix systems of butanol, isopropanol, ethanol, and water containing a fluorescent dye injected into deionized water or ethanol. The reactor comprised a capillary tube having an inside diameter of 0.76 mm and outside diameter of 1.6 mm. The outer tube had an inside diameter of 7.5 mm, was constructed of stainless steel, and was connected to an electrical ground to create an electric field between the capillary tube and the outer tube. Once the fluids were injected into the reactor, video images were taken of the streams with no voltage applied, and with applied voltages of 500 V, 1000 V, 2000 V and 3500 V or 4000V. After each increase in voltage the system was allowed to steady out, although this occurred almost instantaneously.

Example 1

Butanol comprising a small amount of the fluorescent dye uranine was injected into the capillary tube of the electrodynamic micromixing reactor at a rate of 0.8 mL/min. Deionized water was introduced as a continuous fluid in the outer tube at a rate of 50 mL/min.

Example 2

Isopropanol comprising a small amount of the fluorescent dye uranine was injected into the capillary tube at a rate of 0.8 mL/min. Deionized water was introduced as a continuous fluid in the outer tube at a rate of 50 mL/min.

Example 3

Ethanol comprising a small amount of uranine was injected into the capillary tube of the electrodynamic micromixing reactor at a rate of 0.8 mL/min. Deionized water was introduced as a continuous fluid in the outer tube at a rate of 50 mL/min.

Example 4

Water comprising a small amount of the fluorescent dye sodium fluorescein was injected into the capillary tube of the electrodynamic micromixing reactor at a rate of 0.8 mL/min. Deionized water was introduced as a continuous fluid in the outer tube at a rate of 50 mL/min.

Example 5

Ethanol comprising the fluorescent dye uranine was injected into the capillary tube of the electrodynamic micromixing reactor at a rate of 0.8 mL/min. Ethanol was also introduced as a continuous fluid in the outer tube of the reactor at a rate of 50 mL/min.

The electrohydrodynamic mixing accomplished in Examples 1–5 is illustrated visually in FIG. 2. As can be seen, with no voltage applied between the electrodes, dispersion and dissolution are relatively slow, while with increasing voltage, much more rapid and intense micromixing is achieved.

In Example 6, experiments were conducted using a sol-gel reaction system in which the two key reactants were a metallorganic precursor, zirconium tetra-n-butoxide (ZTB) and water. These experiments demonstrate that an electrohydrodynamic micromixing reactor can be used to overcome the challenges posed by rapid reaction kinetics in a metal alkoxide system. A solution of zirconium tetrabutoxide in alcohol was dispersed under different conditions of applied voltage into a flowing stream of the same alcohol having a given concentration of deionized water.

The electrohydrodynamic micromixing reactor used in Example 6 comprised a capillary tube having an inside diameter of 0.76 mm and outside diameter of 1.6 mm. The outer tube had an inside diameter of 7.5 mm, was constructed of stainless steel, and was connected to an electrical ground to create an electric field between the capillary tube and the outer tube. SEM photographs of representative product particles are shown in FIG. 3 (ethanol/ZTB-ethanol/water system).

Example 6

A solution of 0.5 M ZTB in ethanol was injected into a stream of deionized water in ethanol at flow rate ratios ranging from 0.022–0.045. For all the experiments, an electric field of 3000 V was applied. In two separate experiments a 0.5 M ZTB/ethanol solution was injected at flow rates of 0.33 mL/min and 0.67 mL/min. into a 0.5 M deionized water/ethanol solution having a flow rate of 15 mL/min. In two additional experiments, a 0.5 M ZTB/ethanol solution was injected at flow rates of 0.33 mL/min and 0.67 mL/min into a 17 mL/min 1.0 M deionized water/ethanol solution.

The results of the experiments are displayed in FIG. 3. It is seen in FIG. 3 that submicron particle size is controllable through variation of reactant/fluid ratios, and that there is a narrow size distribution.

Example 7

Experiments were conducted to demonstrate the effect of applied voltage on product quality for a butanol-butanol system. The electrohydrodynamic micromixing reactor used in this example comprised a capillary tube having an inside diameter of 0.20 mm and outside diameter of 1.6 mm. The outer tube had an inside diameter of 9.5 mm. The insulation tube had an outside diameter of 3.2 mm and was flush with the end of the conical tip of the capillary tube. The outer tube was constructed of stainless steel and was connected to an electrical ground to create an electric field between the capillary tube and the outer tube. A 1.923 M ZTB in butanol solution was injected at a flow rate of 1.3 mL/min. into a 0.527 M butanol in water solution having a flow rate of 23.7 mL/min. The combination of these two streams resulted in a reaction mixture of 0.5 M water and 0.1 M ZTB. Images were taken of the particles produced with no voltage applied and with applied voltages of 5000 V and 8000 V. The results are set forth in FIG. 4.

Figure 4A:
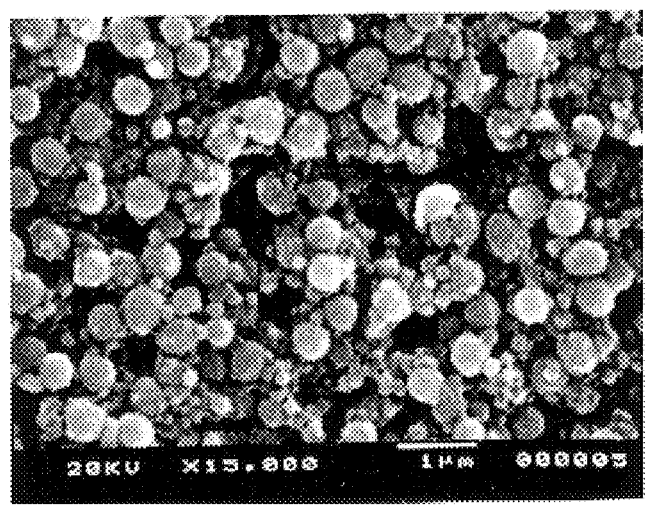
Figure 4B:
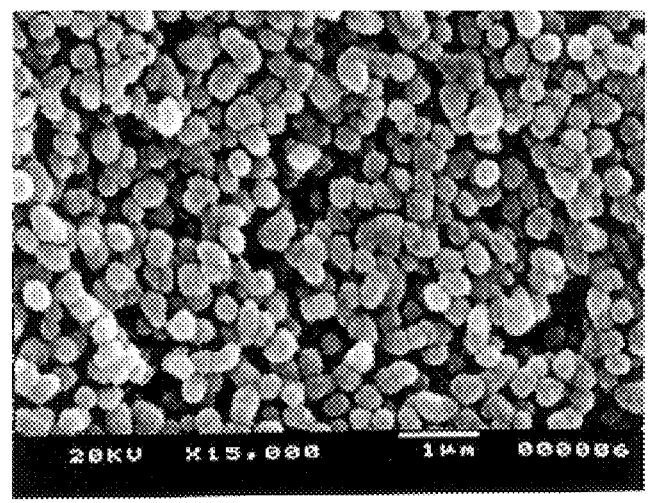
Figure 4C:
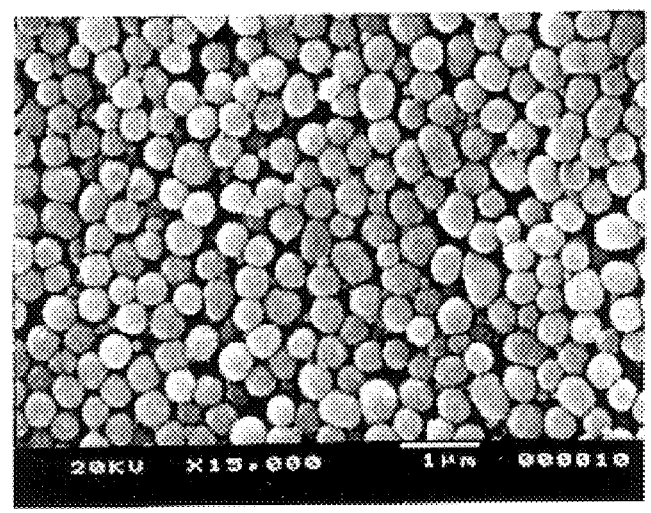

Under conditions with no applied voltage, macroscopic hydrodynamic mixing and diffusion controlled the contact of the reactants in the medium, and as shown in FIG. 4(a) a heterogeneous product was formed. In addition, at lower voltages, corresponding to lesser uniformity of the reactant mixture, there is greater particle agglomeration as demonstrated in FIG. 4(b). Homogeneity of the product was improved by the application of 5000 V. However, with an applied voltage of 8000 V, a highly desirable product was formed that is relatively dense, non-agglomerated, nearly spherical, and has a narrow size distribution. (See FIG. 4(c)). There have been no reports in the prior art of the production of particles having these characteristics from a reaction mixture of 0.5 M water and 0.1 M ZTB. In addition, particle suspensions produced at 5000 volts according to the present invention settled within 30 minutes, while the sol produced at 8000 volts was stable overnight.

Example 8

A pair of experiments was conducted to: (1) demonstrate the effectiveness of the present invention for producing homogeneous particles compared to conventional methods, and (2) to display how electrohydrodynamic micromixing can be used to controllably produce particles of ultrafine size by injecting a highly concentrated reactant stream.

Each experiment had an overall concentration of reactants in the mixed solution before reaction of 0.1 M ZTB and 0.3 M water in butanol. In the first experiment, for which the resulting product is shown in FIG. 5(a), equal volumes of two solutions (one 0.2 M ZTB in butanol and the other 0.6 M deionized water in butanol) were mixed by a conventional approach of rapidly introducing them into a stirred beaker. The second experiment was conducted using an electrohydrodynamic micromixing reactor having the same configuration as in Example 7. In this experiment, a solution of 1.923 M ZTB in butanol was injected at a flow rate of 1.3 mL/min into a solution of 0.316 M deionized water in butanol flowing at 23.7 mL/min, with an applied voltage of 8 kV. The product of the second experiment is shown in FIG. 5(b).

Although the total amounts of reactants were the same in both experiments, the products were significantly different. This is due to two factor. First, the improved mixing achieved by the electrohydrodynamic flows leads to better homogeneity than the conventional mixing cases. Second, the rapid homogenization achievable through electrohydrodynamic mixing allows the injection of a much more concentrated reactant stream. This increases the nucleation rates during initial reaction stages, resulting in a larger number of smaller particles.

It has been demonstrated that it is possible to produce non-agglomerated, monodispersed, submicron-sized, sphere-like powders through electrohydrodynamic mixing by controlling the reaction and spraying conditions. The size and homogeneity of product can be controlled through selection of reaction conditions, including reactant concentration and fluid flow rates. A correlation between spraying voltage and the particle size, homogeneity, and sol stability was observed. These positive results indicate that this method could be used to dramatically improve advanced material production.

It should be understood that the foregoing relates to particular embodiments of the present invention, and that numerous changes may be made therein without departing from the scope of the invention as defined by the following claims.

We claim:

1. A method for the production of particles comprising:
   injecting a first fluid in a first conduit;
   injecting a second fluid through a second conduit into the first conduit wherein one end of the second conduit is located within the first conduit;
   applying an electric field between the second conduit and the first conduit;
   wherein the first fluid comprises a first reactive species and the second fluid comprises a second reactive species reactive with the first reactive species such that the first and second reactive species react with one another to produce particles.

2. The method of claim 1, wherein the second conduit is a capillary tube.

3. The method of claim 1, wherein the electric field is applied between the second conduit and an electrode placed on the interior of the first conduit.

4. The method of claim 1, wherein the electric field is applied between the second conduit and an electrode placed on the exterior of the first conduit.

5. The method of claim 1, wherein the electric field is applied between the second conduit and an electrode comprising the first conduit.

6. The method of claim 1, wherein the second conduit is partially disposed within the first conduit so that there is an annular space between the second conduit and the first conduit, and the first fluid is injected into the annular space.

7. The method of claim 1, wherein the first fluid is introduced continuously into the first conduit.

8. The method of claim 1, wherein the first fluid is miscible or partially miscible with the second fluid.

9. The method of claim 1, wherein the first fluid has a high dielectric constant and low conductivity.

10. The method of claim 1, wherein the first fluid is deionized water, an alcohol or a mixture thereof.

11. The method of claim 1, wherein the second conduit comprises a conical tip.

12. The method of claim 1, wherein electrodynamic flows of the first and second fluids are caused by charge injection at the tip of the second conduit.

13. The method of claim 12, wherein the electrodynamic flows induce turbulent mixing of the first and second fluids.

14. The method of claim 1, wherein a conditioning reagent is introduced downstream of the particle producing reactions.

15. The method of claim 1, wherein the particle producing reaction is a sol-gel reaction.

16. The method of claim 15, wherein the second fluid comprises an alkoxide dissolved in an alcohol.

17. The method of claim 16, wherein the alkoxide is zirconium butoxide, zirconium ethoxide or zirconium isopropoxide.

18. The method of claim 16, wherein the alcohol is ethanol, butanol, methanol or isopropanol.

19. The method of claim 15, wherein the first fluid comprises an alcohol, deionized water or a mixture thereof.

20. The method of claim 15, wherein the particles produced are binary oxide particles.

21. The method of claim 1, wherein the particles produced are silica particles.

22. The method of claim 21, wherein the silica particles are produced via hydrolysis and condensation of tetraethylorthosilicate or tetramethylorthosilicate.

23. The method of claim 1, wherein the particles produced are titania microspheres.

24. The method of claim 23, wherein the titania particles are produced by the hydrolysis and condensation of titanium alkoxides.

25. The method of claim 1, wherein the particles produced are ferric oxide particles.

26. The method of claim 25, wherein the ferric oxide particles are produced by hydrolysis of $Fe(OC_4H_9)_3$.

27. The method of claim 1, wherein the particles produced are silicon carbide particles.

28. The method of claim 27, wherein the silicon carbide particles are produced by hydrolysis and condensation of phenyltrimethoxysilane or a mixture of phenyltrimethoxysilane and tetraethylorthosilicate.

29. The method of claim 1, wherein the particles produced are coated inorganic colloidal particles.

30. The method of claim 29, wherein the particles are silica coated hematite, titania coated silica, titania coated zinc oxide, or yttrium basic carbonate on polystyrene latex.

31. The method of claim 1, wherein the particle producing reactions are inverse phase precipitations.

32. The method of claim 1, wherein the particle producing reactions are chemical reduction reactions.

33. A method for the production of particles comprising:
    injecting a first fluid in a first conduit;
    injecting a second fluid through a series of smaller conduits into the first conduit wherein one end of each of the smaller conduits is located within the first conduit so that there is a space between the smaller conduits and the first conduit; and
    applying an electric field between the smaller conduits and the first conduit;
    wherein the first fluid comprises a first reactive species and the second fluid comprises a second reactive species reactive with the first reactive species such that the first and second reactive species react with one another to produce particles.

34. The method of claim 33, wherein the smaller conduits are capillary tubes.

35. The method of claim 33, wherein the electric field is applied between the smaller conduits and an electrode placed on the interior of the first conduit.

36. The method of claim 33, wherein the electric field is applied between the smaller conduits and an electrode placed on the exterior of the first conduit.

37. The method of claim 33, wherein the electric field is applied between the smaller conduits and an electrode comprising the first conduit.

38. The method of claim 33, wherein the first fluid is introduced continuously into the space between the smaller conduits and the first conduit.

39. The method of claim 33, wherein the first fluid has a high dielectric constant and low conductivity.

40. The method of claim 33, wherein the first fluid is deionized water, an alcohol or a mixture thereof.

41. The method of claim 33, wherein the smaller conduits comprise conical tips.

42. The method of claim 33, wherein electrodynamic flows of the first and second fluids are caused by charge injection at the tips of the smaller conduits.

43. The method of claim 42, wherein the electrodynamic flows induce turbulent mixing of the first and second fluids.

44. The method of claim 33, wherein multiple reactive species are introduced via the smaller conduits.

* * * * *